United States Patent
Devasigamony

(10) Patent No.: US 12,192,272 B1
(45) Date of Patent: Jan. 7, 2025

(54) FRONTEND STORAGE PORT REBALANCING AND ALLOCATION USING MACHINE LEARNING TECHNIQUES

(71) Applicant: Dell Products L.P., Round Rock, TX (US)

(72) Inventor: Davidson Devasigamony, Boxborough, MA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/363,097

(22) Filed: Aug. 1, 2023

(51) Int. Cl.
*H04L 67/1008* (2022.01)
*H04L 41/16* (2022.01)
*H04L 67/1097* (2022.01)

(52) U.S. Cl.
CPC .......... *H04L 67/1008* (2013.01); *H04L 41/16* (2013.01); *H04L 67/1097* (2013.01)

(58) Field of Classification Search
CPC ................. H04L 67/1008; H04L 41/16; H04L 67/1097
See application file for complete search history.

(56) References Cited

U.S. PATENT DOCUMENTS

| | | | | |
|---|---|---|---|---|
| 5,987,442 A | * | 11/1999 | Lewis | H04L 43/00 706/10 |
| 10,148,483 B1 | * | 12/2018 | Lippitt | G06F 3/061 |
| 2005/0108444 A1 | * | 5/2005 | Flauaus | H04L 41/0894 710/15 |
| 2010/0161827 A1 | * | 6/2010 | Griesmer | H04L 12/2869 709/232 |
| 2017/0147248 A1 | * | 5/2017 | Chitti | G06F 3/061 |
| 2019/0109799 A1 | * | 4/2019 | Nipane | H04L 41/0894 |

* cited by examiner

*Primary Examiner* — Philip C Lee
(74) *Attorney, Agent, or Firm* — Amin, Turocy & Watson, LLP

(57) ABSTRACT

The technology described herein is directed towards intelligent storage frontend port re-balancing/allocation in a datacenter's port groups having data maintained in masking view data. Artificial intelligence/machine learning (AI/ML) models accurately monitor the storage array frontend port utilization metrics to perform dynamic port rebalancing between overutilized and underutilized storage ports. The input to the models can further include historic seasonality and/or historical trending utilization data to more effectively predict the future growth of frontend port utilization based on model forecasting. The models can also be used to determine more optimal frontend port placement with respect to new storage provisioning requests. The models can be part of cloud-based monitoring tools, or can be coupled to a storage array to intelligently and dynamically perform the storage frontend port rebalancing operations.

20 Claims, 10 Drawing Sheets

FRONTEND STORAGE PORT REBALANCING AND ALLOCATION USING MACHINE LEARNING TECHNIQUES

BACKGROUND

In a datacenter, servers communicate with storage arrays through frontend ports. The number and type of frontend ports depends on the type of port (e.g., fibre channel) and size of the storage array. Large enterprise storage arrays can have on the order of hundreds or thousands of frontend ports, for example.

Currently, datacenter storage administrators allocate storage ports based on an initial storage requirements. Over time, changed (e.g., increased) storage requirements, along with the possibility of multiple different storage administrators managing the storage array, can result in the storage frontend ports being unevenly utilized (that is, some frontend storage ports are overutilized while others are underutilized).

At present, a storage administrator manually monitors and analyzes storage port utilization metrics to identify which frontend ports are overutilized, as such ports may have performance bottlenecks due to the overutilization. Once determined, the storage administrator manually performs port rebalancing/port realignment in order to more evenly distribute the load on the frontend ports.

There are several different port metrics that need to be analyzed to identify the overutilized ports. Based on a storage administrator's level of experience and expertise, different port utilization metrics may be considered for identifying overutilized ports, which can be tedious and inconsistent. Manual port rebalancing also can be error prone, and if not performed with caution, can lead to data unavailable/data loss events due to human errors in rebalancing the storage ports,

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
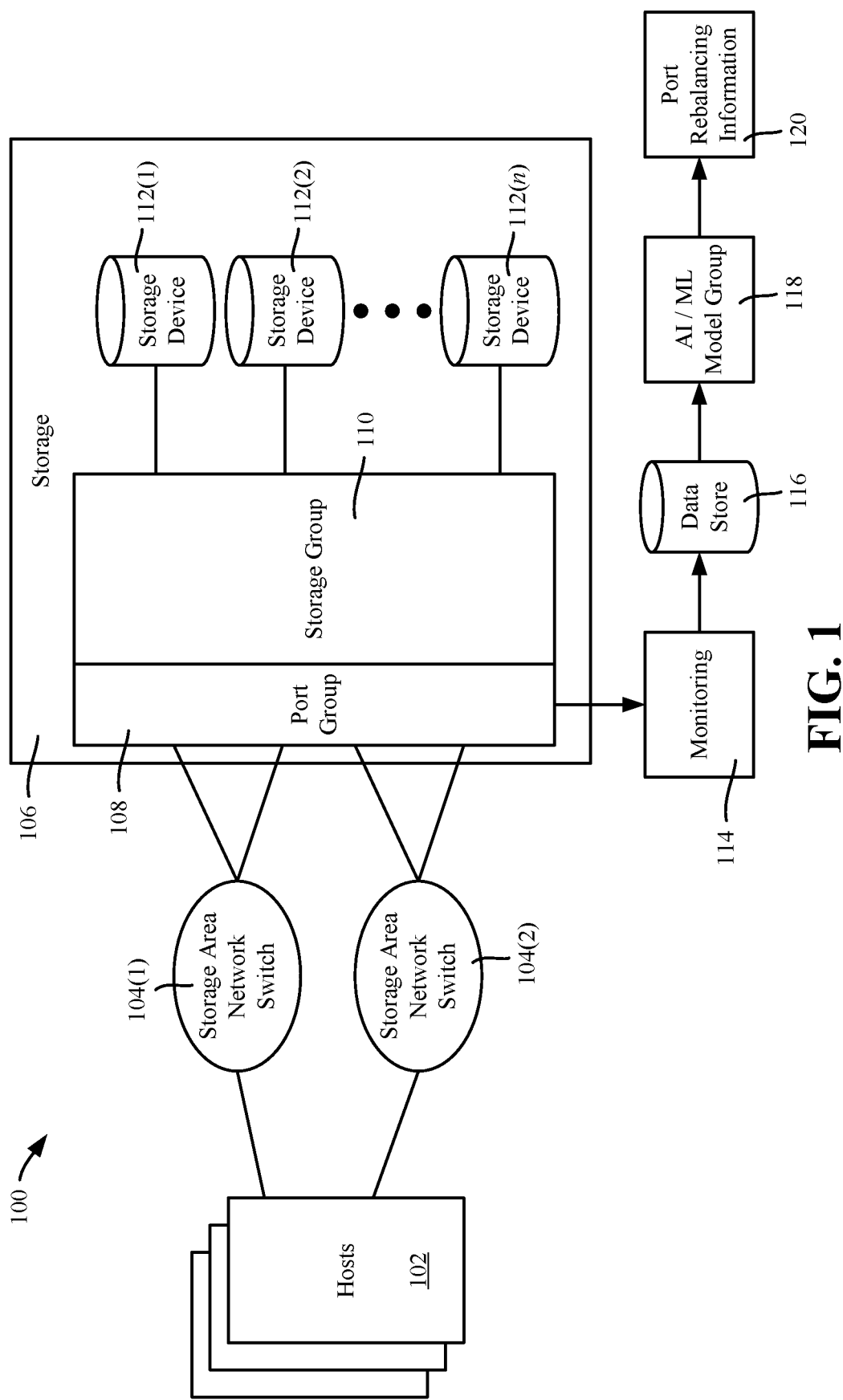
FIG. 1 is an example block diagram representation of an example system/architecture in which port rebalancing information is obtained from an artificial intelligence/machine learning (AI/ML) models(s), in accordance with various embodiments and implementations of the subject disclosure.

Various embodiments of the technology described herein are generally directed towards inputting frontend storage port metrics data to one or more artificial intelligence/machine learning (AI/ML) models, which in turn intelligently and dynamically perform or recommend storage frontend port rebalancing/realignment/new port placement based on modifying masking view data. The model input can include port (and director engine) metrics, which can include historic seasonality and historic trending data of the frontend port utilization metrics over a relatively lengthy period (e.g., two or more years) to be able to intelligently and dynamically determine the storage frontend port rebalancing/realignment/new provisioning placement, as well as forecast and predict the future growth with respect to the port utilization metrics.

Described is monitoring and analyzing different port utilization (and if available director engine) metrics to identify the overutilized frontend storage ports that need to be rebalanced with respect to handling data load. Also described is forecasting and predicting future growth of the port utilization. The input data are used by a trained model group of one or more AI/ML models that recommend (or can automatically control) the rebalancing/placement of frontend storage ports in the masking view, based on historic port metrics and forecasted/predicted port metrics. The model group can be part of a cloud-based monitoring tool, or can be coupled to (natively implemented on) a storage array.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations. It also should be noted that terms used herein, such as "optimize," "optimization," "optimal" and the like only represent objectives to move towards a more optimal state, rather than necessarily obtaining ideal results. Similarly, "maximize" means moving towards a maximal state (e.g., up to some processing capacity limit), not necessarily achieving such a state, as does "minimize" (moving towards a minimal state) and the like.

Embodiments of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 is an example representation of a system/architecture 100 (e.g., in a datacenter) in which a number of hosts 102 are coupled via some number of storage area network (SAN) switches (e.g., 104(1)-104(2) are shown) to storage 106 (e.g., a storage array). The storage 106 is configured with a port group 108, a storage group 110 and storage devices 112(1)-112(n) as generally described herein.

As shown in FIG. 1, various port metrics of the port group are obtained by a monitoring component 114 and recorded in one or more suitable data stores 116. As described herein, the port metrics (possibly after some preprocessing as also described herein) are input to an AI/ML model group 118 (one or more trained models) that outputs port rebalancing information 120. The port rebalancing information 120 may be in the form of a recommendation (e.g., to a storage administrator), or may be data that is used to automatically rebalance the ports, e.g., by modifying masking view data.

Figure 2:
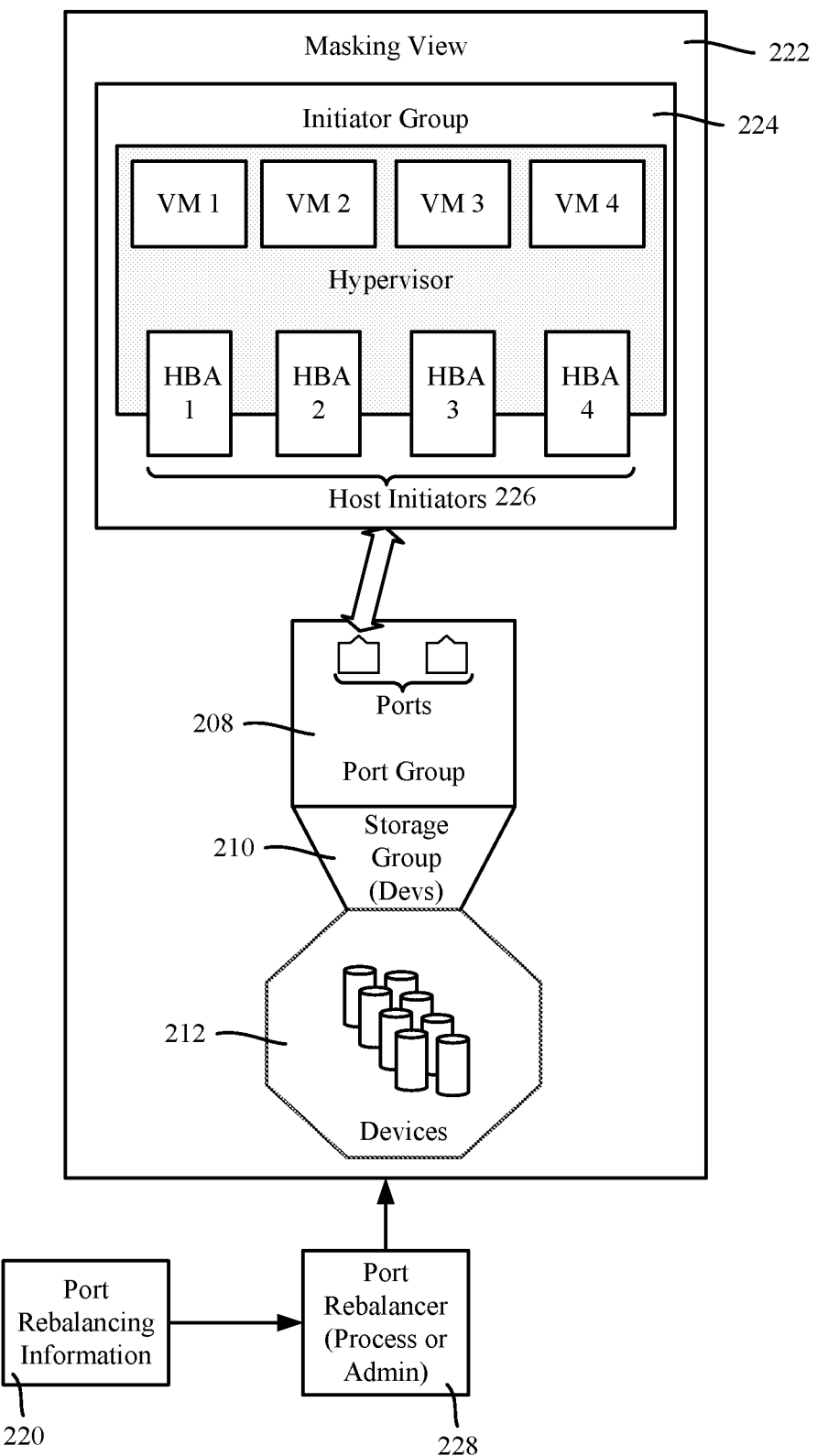
FIG. 2 is an example representation of a masking view having that can be modified for port rebalancing, in accordance with various embodiments and implementations of the subject disclosure.

FIG. 2 describes an example masking view 222, in which instances of components similar to those of FIG. 1 are labeled 2xx (FIG. 2) instead of 1xx (FIG. 1). In general, the masking view 222 comprises data that associates a host initiator 226 with a ports group 208 and a storage group 210. More particularly, logical storage devices are made visible to the hosts through masking views.

An administrator (or process) creates a masking view, including a storage group (the devices visible to the hosts), a port group (the storage front-end ports that make the devices visible), and an initiator group (set of channels). The initiator group contains the host bus adaptor (HBA) ports' world wide names (also known as initiators). The masking views are stored in the storage system containing the devices, such that for a server to have access to a set of devices in a storage system, the server needs to be part of a masking view in that system. Access depends on the correct combination of identification data {host initiator name, ports group identifier data, storage group identifier data}, whereby a different server does not have access to the devices' data.

As shown in FIG. 2, once output by the model group 18 (FIG. 1) as described herein, port rebalancing information 220 can be used to modify (block 228) the appropriate masking group data and thus perform rebalancing/realignment the frontend storage ports in order to more evenly distribute the load on the frontend ports. The port rebalancing information 220 can also be used to determine which front end storage ports are less utilized, (e.g., relative to some utilization criterion, such as below X percent utilization), and thus are good candidates for new provisioning requests. As described herein, intelligent (and possibly dynamic) storage frontend port rebalancing/allocation in a port group of a masking view using AI/ML model(s) is based on more accurately and more consistently monitoring and analyzing the storage array frontend port utilization metrics, which can be based on recent usage data as well as based on historic seasonality utilization data and historic trending utilization data. For example, at certain times of the year, e.g., holiday gift shopping, certain ports get significantly more usage from certain workloads, and thus rebalancing in anticipation of high utilization based on seasonality-based forecasting is likely beneficial. With respect to trending utilization data, consider that a set of ports has grown from fifteen percent to seventy percent in the last year; problems can occur if this trend continues, and thus forecasting future usage for rebalancing or provisioning of new ports before problems start showing up is likely highly desirable. The models can be regularly retrained to keep up with current trends.

With the use of historical data, the AI/ML model(s) also can effectively predict the future growth of frontend port utilization (what the utilization metrics are likely to be at a future point in time), and make a recommendation between overutilized and underutilized storage ports for rebalancing and placement for new storage provisioning requests, including in for future recommendations. Indeed, using AI/ML analytics forecasting with historical frontend port metrics (e.g., on the order of two or more years of metrics data) can be used for storage port rebalancing/new allocation placement that takes into account future forecasted/predicted growth. Note that in contrast, manual port rebalancing by a storage administrator typically would at best use only limited historic usage information (e.g., the past few days) with decisions made on such minimal historic data only.

Several different port utilization metrics can be analyzed programmatically to identify the overutilized frontend ports. Non-limiting examples of port metrics include port metrics data can include percentage busy data, bandwidth data, bandwidth by read data, bandwidth by write data, input-output size data, input-output size by read data, input-output size by write data, input-output operations per second data, input-output operations per second by read data, input-output operations per second by write data, latency data, latency by read data, and/or latency by write data. Further examples can include average input-output size data, bad receive character count data, discarded frames count data, expired frames count data, input-output data, checksum error count data, invalid cyclic redundancy check count data, link failure count data, loss of signal count data, loss of sync count data, megabytes read data, megabytes written data, megabytes data, maximum speed gigabytes data, primitive sequence protocol errors count data, read response time data, reads data, received end of frame abort count data, response time data, receive power data, speed gigabytes data, transmit power data, write response time data, and/or write data. In some datacenter implementations, the frontend storage ports are coupled to at least one director engine (e.g., fibre channel director(s)). For such implementations, the port metrics data can also include, but is not limited to, director engine data including new orders per minute data, transactions per minute data, server CPU utilization data, input-output operations per second data, average read response time data, and/or average write response time data. Other types of datacenters may have differently named port metrics, but in general the same concepts apply across datacenters.

Regardless of which data is used or has more weight with respect to the AI/ML models, frontend storage port rebalancing and new provisioning can be determined using director/port metrics, along with seasonality and historic trending data of the frontend port utilization metrics over a prior timeframe. Once determined, the system is able to intelligently and dynamically perform the storage frontend port re-balancing/re-alignment in the masking view data. For example, historic seasonality and historical trending port utilization metrics/data are accounted for over a prior period to more accurately identify the imbalance in port utilization and make the recommendation, e.g., using an analytics load index AI/ML model. Further, using another AI/ML technique (an AI/ML analytics forecasting model) that uses frontend port metrics over that prior period of collected port metrics historic data can forecast/predict port usage growth rate and make the recommendation based on such prediction/forecasting growth information.

Figure 3:
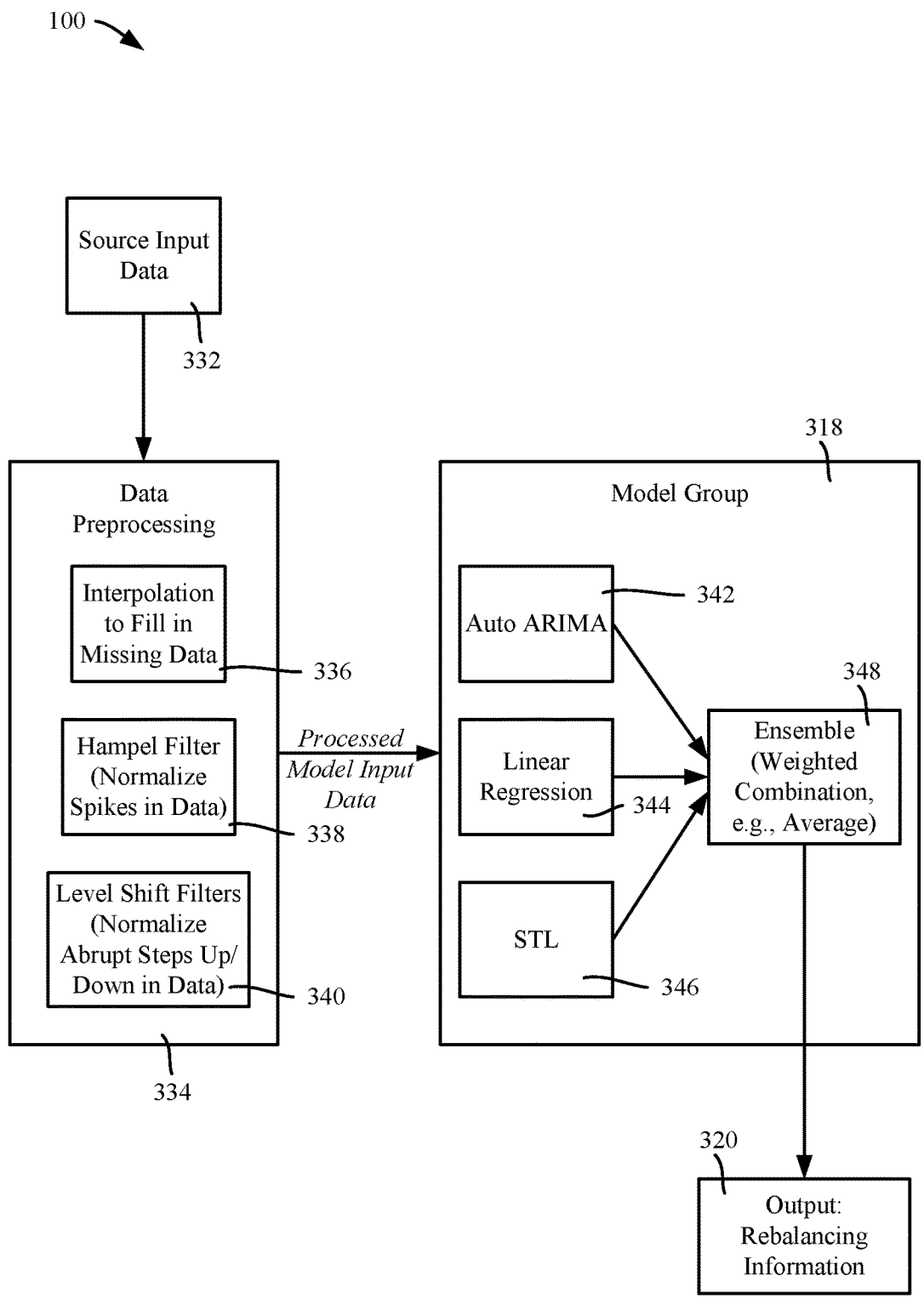
FIG. 3 is an example block diagram representation of components and data flow for an AI/ML-based analytics/prediction model, in accordance with various embodiments and implementations of the subject disclosure.

FIG. 3 shows additional details of one example implementation. In FIG. 3, source input data 442 (e.g., frontend port metrics data and historical port usage data) is input to a data preprocessing component that produces data that is more suitable for model input. Preprocessing can include, but is not limited to, filling in any missing data via interpolation (block 336), smoothing any spikes in the data (e.g., using a Hampel filter that normalizes data if there is a data spike present, block 338) and normalizing abrupt steps in the data via a level shift filter (where a level shift filter normalizes the data where there are any abrupt steps up/down in the source data (block 340).

Once the source input data 332 has been processed into the model input data, the model input data is input into the model group 318 to obtain prediction data; (the models can detect seasonality in the historical data). In the example implementation of FIG. 3, the model group includes three models, namely an auto ARIMA (auto-regressive integrated moving average) model 342, a linear regression model 344 and an STL (seasonal and trend decomposition model using locally estimated scatterplot smoothing (loess)) model 346. An ensemble component 348 combines (e.g., averages) the predictions from the models 342, 344 and 346 to generate the rebalancing information 320. Note that the models' output combination can be weighted, e.g., a weighted average of the three predictions.

Figure 4A:
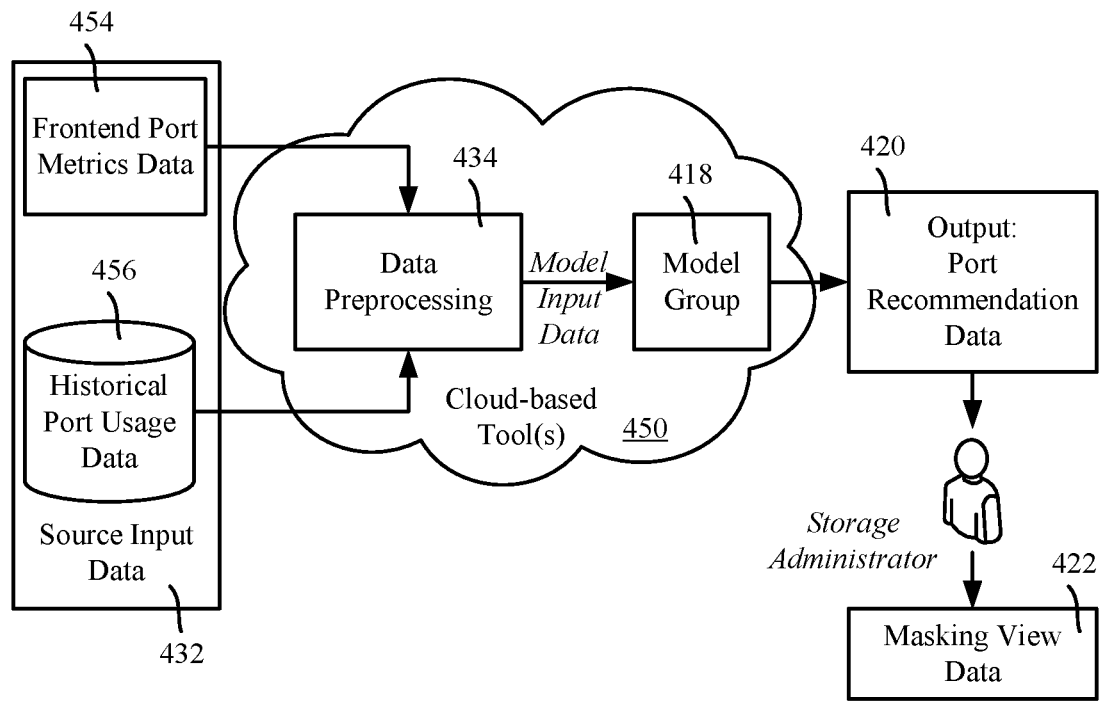
FIG. 4A is an example representation of leveraging a cloud-based tool to obtain port rebalancing/allocation recommendation data, in accordance with various embodiments and implementations of the subject disclosure.

FIG. 4A shows an example in which AI/ML model-based intelligent port allocation/rebalancing recommendations can be performed via cloud-based monitoring tools, e.g., a model group 418 is coupled to one or more cloud-based monitoring tools 450 to leverage the capabilities thereof. Note that some cloud-based tools already can include an analytics load index AI/ML algorithm and/or analytics forecasting AI/ML algorithm. For example, data from an AI/ML algorithm such as (STL) (seasonal and trend decomposition model using locally estimated scatterplot smoothing (loess)), can be fed into a forecasting algorithm such as an ARIMA model ("auto-regressive integrated moving average").

In FIG. 4A, source input data 442 in the form of frontend port metrics data 454 and historical port usage data 456 may be preprocessed (block 434) as part of the obtaining of the rebalancing data and the prediction/forecasting as described with reference to FIG. 3. After any preprocessing the model input data is input to the model group 418, which then outputs a rebalancing recommendation 420 (which can include recommending storage ports for new provisioning needs, as well as future growth information/recommendations). In this scenario, the recommendation data is interpreted by a storage administrator who then makes appropriate changes to (or if need, a creates new) the masking view data 422.

When available, the use of existing cloud monitoring tools algorithm for the rebalancing recommendation for results in a more intelligent, dynamic and accurate way to predict/forecast port utilization needs based on existing and historical frontend port metrics. Note that cloud monitoring tools can obtain frontend port metrics in the form of telemetry data, obtained via secure remote services (SRS)/managed file transfer (MFT) from customer storage systems. The technology described herein can leverage these frontend port metrics/data to extrapolate and use the existing AI/ML models (such as analytics prediction that already exists in at least one monitoring tool) to forecast/predict the future growth and thereby make the recommendation for rebalancing of the frontend ports. Also, there can be a recommendation to rebalance the frontend ports for storage administrators at present rather than in the future, e.g., for manual rebalancing by a storage administrator.

The ability to leverage telemetry data from various customers allows model training and retraining across many types of time series datasets, providing robust models. Notwithstanding, if the datasets can be separated by criteria such as customer/customer types/application data needs, there can be differently trained models for different scenarios, assuming that ports can be provisioned separately by similar such criteria within datacenters. For example, one type of customer or application may have relatively few but very large data reads and writes, versus another customer with many small reads and writes; accordingly, different models may provide better provisioning results if trained with corresponding different types of telemetry datasets.

Figure 4B:
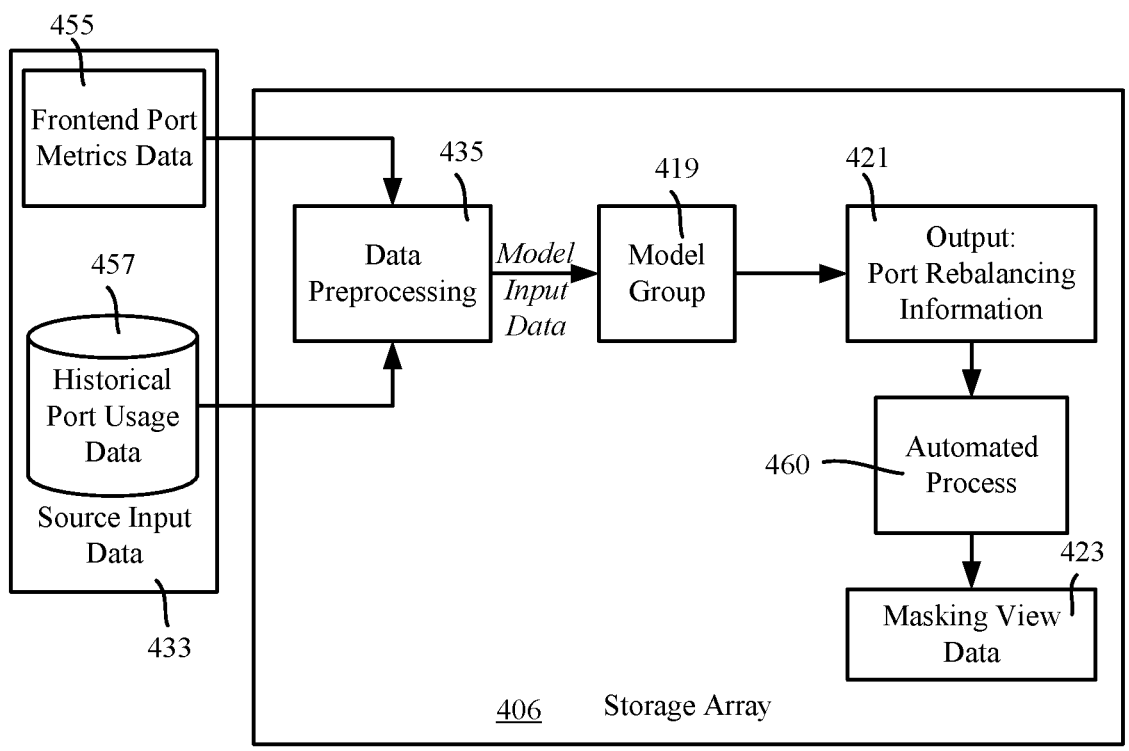
FIG. 4B is an example representation of coupling an AI/ML-based analytics/prediction model group to a storage array to automatically perform port rebalancing/allocation based on port rebalancing information output by the model group, in accordance with various embodiments and implementations of the subject disclosure.

FIG. 4B is generally similar to FIG. 4A, except that the operations are natively performed by components coupled to a storage array 406. Thus, source input data 433 in the form of frontend port metrics data 455 and historical port usage data 457 may be preprocessed (block 435) as part of the obtaining of the rebalancing data and the prediction/forecasting, as generally described with reference to FIG. 3. After any preprocessing, the model input data is input to the model group 419, which then outputs port rebalancing information 421 (which can include storage ports for new provisioning needs, as well as future growth information). In this example scenario of FIG. 3, the port rebalancing information 421 can be used by an automated process 460 which automatically makes appropriate changes to the masking view data 423 to accomplish the desired rebalancing. Such automatic rebalancing can be preapproved by a storage administrator, e.g., utilizing multi-pathing and path selection policies/claim-rules to be able to perform the rebalancing dynamically based on preapproved action by the storage administrator.

In sum, by applying a similar forecasting model in a storage array, the results of the model can be used to make the recommendation for the frontend port rebalancing/re-alignment based on the storage port metrics. In such scenarios where the port rebalancing can be dynamically performed, there need not be manual intervention, which avoids possible human errors that could lead to data unavailable/data loss events.

Figure 5:
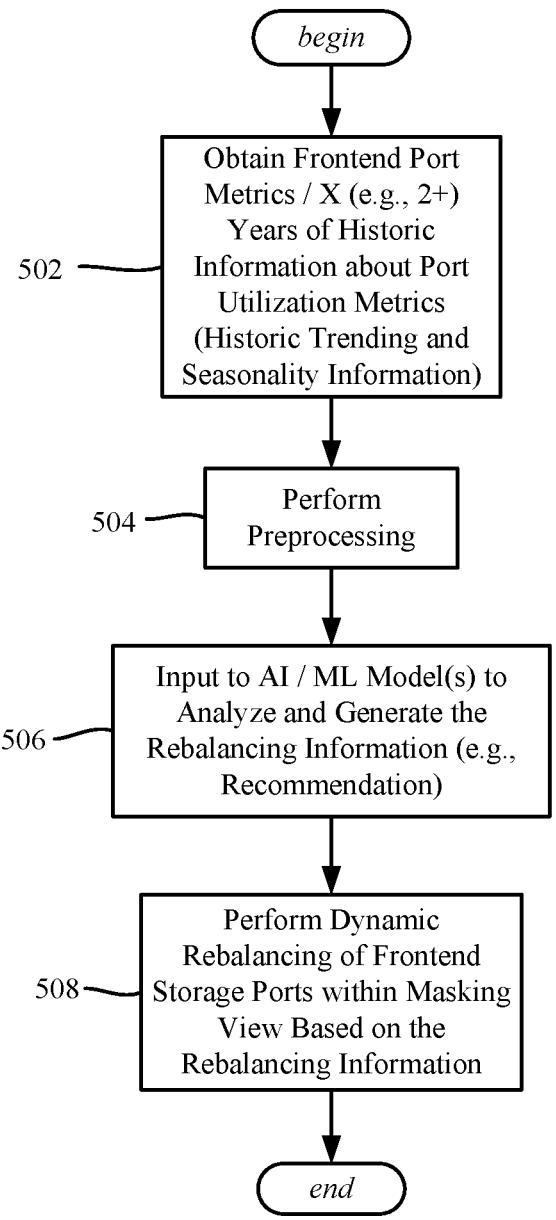
FIG. 5 is a flow diagram showing example operations related to performing dynamic rebalancing of frontend storage ports within masking view based on the rebalancing information obtained from AI/ML model(s), in accordance with various embodiments and implementations of the subject disclosure.

FIG. 5 summarizes the general operations and flow of data, beginning at operation 502 which represents accessing the frontend port metrics and historic information obtained from (e.g., X prior years) of recorded port utilization metric (e.g., corresponding to telemetry) data. Operation 504 represents performing of the (optional) preprocessing of the data as described with reference to FIG. 3.

Operation 506 represents inputting the data to the AI/ML model group to analyze the data, and based on the analysis, generate the rebalancing information. Operation 504 represents performing of the rebalancing (or allocation) of the frontend storage ports based on the rebalancing information.

Figure 6:
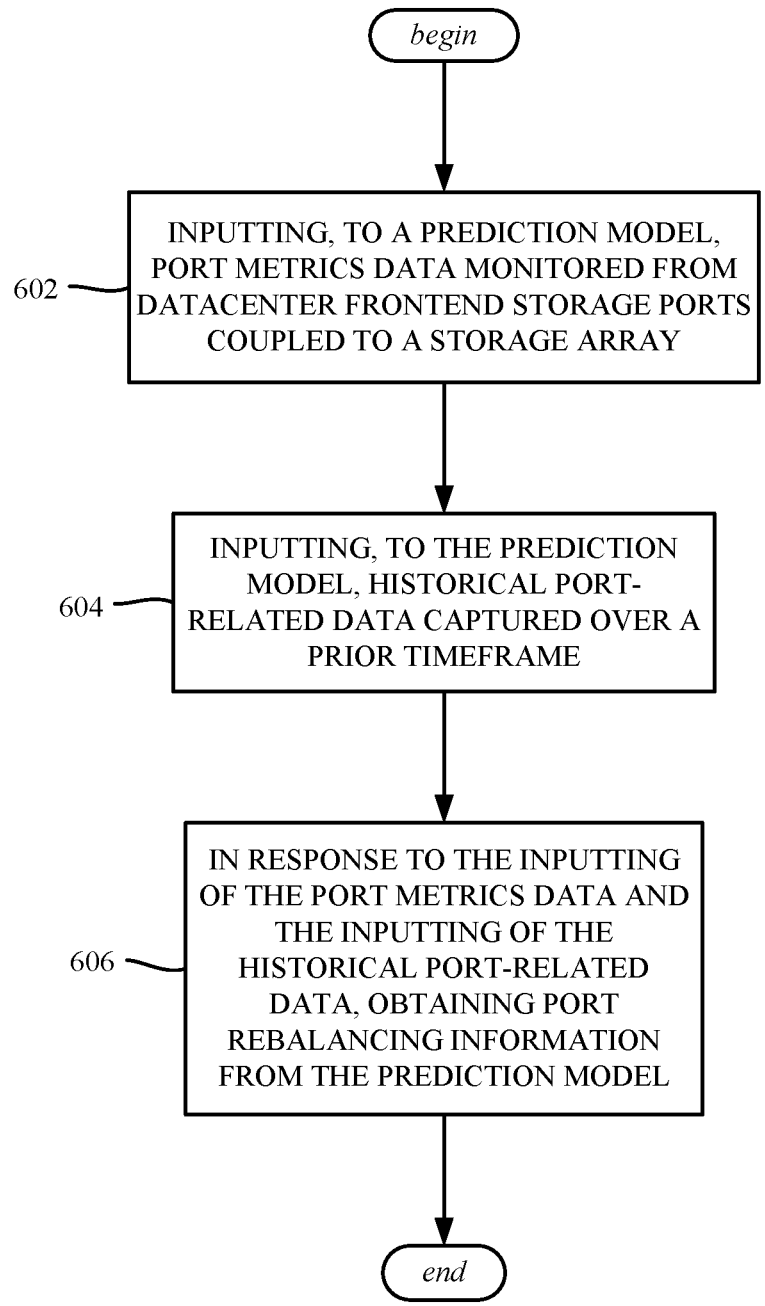
FIG. 6 is a flow diagram showing example operations related to obtaining port rebalancing information from the prediction model based on monitored frontend storage port metrics data, in accordance with various embodiments and implementations of the subject disclosure.

One or more embodiments can be embodied in a system, such as represented in the example operations of FIG. 6, and for example can include a memory that stores computer executable components and/or operations, and a processor that executes computer executable components and/or operations stored in the memory. Example operations can include operation 602, which represents inputting, to a prediction model, port metrics data monitored from datacenter frontend storage ports coupled to a storage array. Example operation 604 represents inputting, to the prediction model, historical port-related data captured over a prior timeframe. Example operation 606 represents in response to the inputting of the port metrics data and the inputting of the historical port-related data, obtaining port rebalancing information from the prediction model.

The port rebalancing information can include identification data representing overutilized frontend storage ports.

The port rebalancing information can include future port growth data.

The model can be coupled to cloud-based monitoring tool.

The model can be coupled to the storage array.

Further operations can include modifying masking view data to rebalance the frontend storage ports.

The historical port-related data can include at least one of usage data, seasonality data or trend data.

Further operations can include preprocessing the port metrics input data, the preprocessing including at least one of: interpolating missing data, normalizing data spikes in the port metrics input data, or normalizing abrupt shifts in the port metrics input data.

The port metrics data can include at least one of: percentage busy data representative of respective percentages that the datacenter frontend storage ports are busy, bandwidth data representative of respective bandwidths associated with the datacenter frontend storage ports, bandwidth by read data representative of respective bandwidths by respective reads associated with the datacenter frontend storage ports, bandwidth by write data representative of respective bandwidths by respective writes associated with the datacenter frontend storage ports, input-output size data representative of respective input-output sizes associated with the datacenter frontend storage ports, input-output size by read data representative of respective input-output sizes by the respective reads associated with the datacenter frontend storage ports, input-output size by write data representative of respective input-output sizes by the respective writes associated with the datacenter frontend storage ports, input-output operations per second data representative of respective input-output operations per second associated with the datacenter frontend storage ports, input-output operations per second by read data representative of respective input-output operations per second by the respective reads associated with the datacenter frontend storage ports, input-output operations per second by write data representative of respective input-output operations per second by the respective writes associated with the datacenter frontend storage ports, latency data representative of respective latencies associated with the datacenter frontend storage ports, latency by read data representative of respective latencies by the respective reads associated with the datacenter frontend storage ports, or latency by write data representative of respective latencies by the respective writes associated with the datacenter frontend storage ports.

The port metrics data can include at least one of: average input-output size data representative of respective average input-output sizes associated with the datacenter frontend storage ports, bad receive character count data representative of respective receive character counts associated with the datacenter frontend storage ports, discarded frames count data representative of respective discarded frames counts associated with the datacenter frontend storage ports, expired frames count data representative of respective expired frames counts associated with the datacenter frontend storage ports, input-output data representative of respective inputs-outputs associated with the datacenter frontend storage ports, checksum error count data representative of respective checksum error counts associated with the datacenter frontend storage ports, invalid cyclic redundancy check count data representative of respective invalid cyclic redundancy check counts associated with the datacenter frontend storage ports, link failure count data representative of respective link failure counts associated with the datacenter frontend storage ports, loss of signal count data representative of respective loss of signal counts associated with the datacenter frontend storage ports, loss of sync count data representative of respective loss of sync counts associated with the datacenter frontend storage ports, megabytes read data representative of respective megabytes read via the datacenter frontend storage ports, megabytes written data representative of respective megabytes written via the datacenter frontend storage ports, megabytes data representative of respective megabytes processed via the datacenter frontend storage ports, maximum speed in gigabytes data representative of respective maximum speeds in gigabytes associated with the datacenter frontend storage ports, primitive sequence protocol errors count data representative of respective primitive sequence protocol errors counts associated with the datacenter frontend storage ports, read response time data representative of respective read response times associated with the datacenter frontend storage ports, reads data representative of respective reads via the datacenter frontend storage ports, received end of frame abort count data representative of respective received end of frame abort counts associated with the datacenter frontend storage ports, response time data representative of respective response times associated with the datacenter frontend storage ports, receive power data representative of respective receive powers associated with the datacenter frontend storage ports, speed in gigabytes data representative of respective speeds in gigabytes associated with the datacenter frontend storage ports, transmit power data representative of respective transmit powers associated with the datacenter frontend storage ports, write response time data representative of respective write response times associated with the datacenter frontend storage ports, or write data representative of respective writes via the datacenter frontend storage ports.

The frontend storage ports can be coupled to at least one director engine, and the port metrics data can include director engine data including at least one of: new orders per minute data representative of respective new orders handled per minute via the datacenter frontend storage ports, transactions per minute data representative of respective transactions handled per minute via the datacenter frontend storage ports, server processor utilization data representative of respective server processor utilization corresponding to processing via the datacenter frontend storage ports, input-output operations per second data representative of respective input-output operations per second associated with the datacenter frontend storage ports, average read response time data representative of respective average read response times associated with the datacenter frontend storage ports, or average write response time data representative of respective average write response times associated with the datacenter frontend storage ports.

The port rebalancing information can include identification data representing less utilized-frontend storage ports based on utilization criterion data associated with a provisioning request.

The prediction model can include at least one of: an autoregressive integrated moving average model, a linear regression model, or a seasonal and trend decomposition using locally estimated scatterplot smoothing model.

The prediction model can include an autoregressive integrated moving average (ARIMA) model, a linear regression model, and a seasonal and trend decomposition using locally estimated scatterplot smoothing (STL) model, and wherein the obtaining of the port rebalancing information from the prediction model can include obtaining a weighted combination of predictions from the ARIMA model, the linear regression model, and the STL model.

Figure 7:
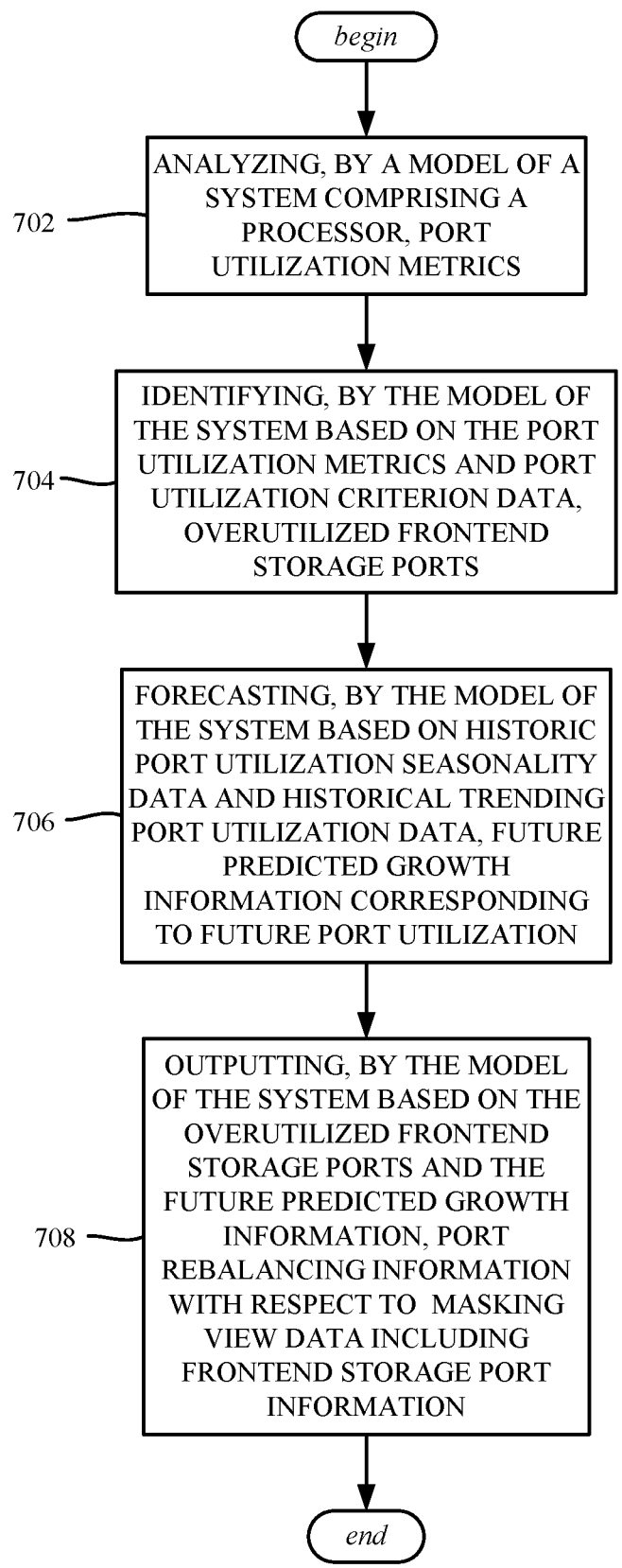
FIG. 7 is a flow diagram showing example operations related to identifying overutilized frontend storage ports and outputting port rebalancing information based thereon, in accordance with various embodiments and implementations of the subject disclosure.

One or more example embodiments, such as corresponding to example operations of a method, are represented in FIG. 7. Example operation 702 represents analyzing, by a model of a system including a processor, port utilization metrics. Example operation 704 represents identifying, by the model of the system based on the port utilization metrics and port utilization criterion data, overutilized frontend storage ports. Example operation 706 represents forecasting, by the model of the system based on historic port utilization seasonality data and historical trending port utilization data, future predicted growth information corresponding to future port utilization. Example operation 708 represents outputting, by the model of the system based on the overutilized frontend storage ports and the future predicted growth information, port rebalancing information with respect to masking view data including frontend storage port information.

Outputting the port rebalancing information can include outputting port rebalancing recommendation data.

Further operations can include communicating, by the system, the port rebalancing information to a process that modifies the masking view data to rebalance the frontend storage ports.

Figure 8:
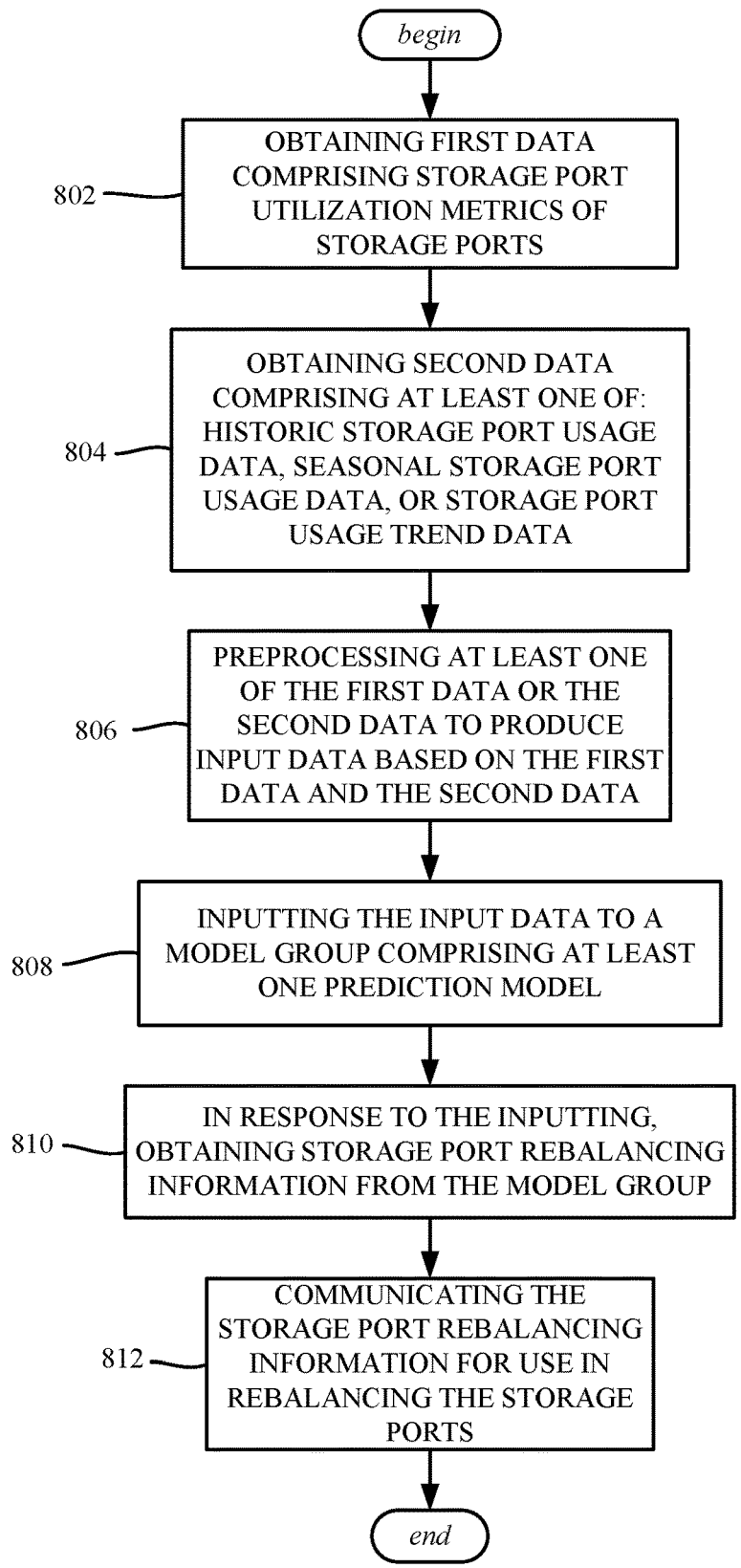
FIG. 8 is a flow diagram showing example operations related to injecting faults based on whether a fixed mode or random mode is specified via input data, in accordance with various embodiments and implementations of the subject disclosure.

FIG. 8 summarizes various example operations, e.g., corresponding to a machine-readable medium, include executable instructions that, when executed by a processor, facilitate performance of operations. Example operation 802 represents obtaining first data including storage port utilization metrics of storage ports. Example operation 804 represents obtaining second data including at least one of: historic storage port usage data, seasonal storage port usage data, or storage port usage trend data. Example operation 806 represents preprocessing at least one of the first data or the second data to produce input data based on the first data and the second data. Example operation 808 represents inputting the input data to a model group including at least one prediction model. Example operation 810 represents in response to the inputting, obtaining storage port rebalancing information from the model group. Example operation 812 represents communicating the storage port rebalancing information for use in rebalancing the storage ports.

Preprocessing the at least one of the first data or the second data to produce the input data can include at least one of: interpolating first missing data in the first data, normalizing first data spikes in the first data, normalizing first abrupt shifts in the first data, interpolating second missing data in the second data, normalizing second data spikes in the second data, or normalizing second abrupt shifts in the second data.

The model group can include an autoregressive integrated moving average (ARIMA) model, a linear regression model, and a seasonal and trend decomposition using locally estimated scatterplot smoothing (STL) model, and wherein the obtaining of the storage port rebalancing information from the model group can include obtaining a weighted combination of first prediction data from the ARIMA model, second prediction data from the linear regression model, and third prediction data from the STL model.

As can be seen, the technology described herein facilitates intelligent and dynamic recommendation (including automated) storage frontend port rebalancing/allocation in port group of a masking view. The technology described herein accurately monitors storage array frontend port utilization metrics, including based on historic seasonality and historic trending utilization data, to determine port rebalancing/port provisioning needs while also effectively predicting the future growth of frontend port utilization. As such, the storage frontend ports are more evenly utilized with respect to data handling loads. The technology described herein thus overcomes the drawbacks of manual evaluation of storage port utilization metrics and manual rebalancing/provisioning.

Figure 9:
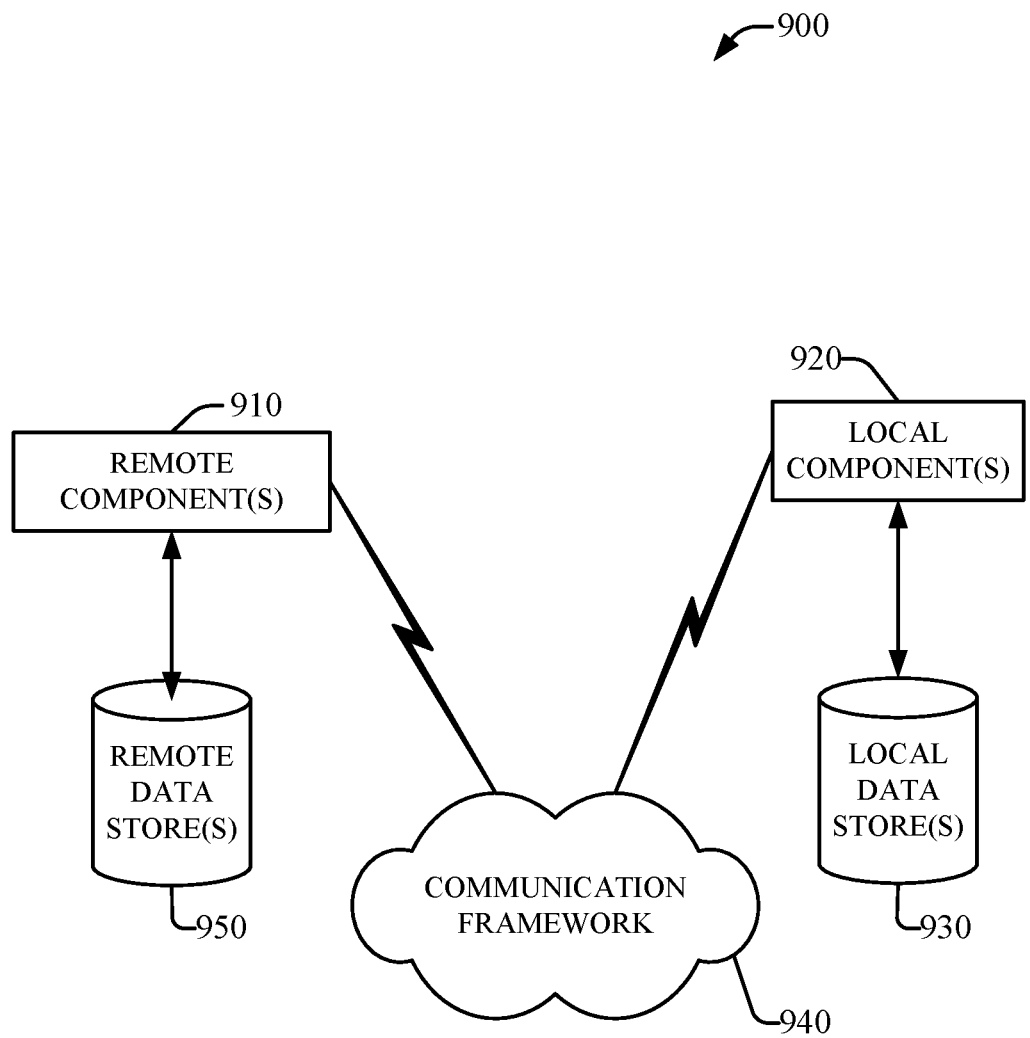
FIG. 9 is a block diagram representing an example computing environment into which embodiments of the subject matter described herein may be incorporated.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise an automatic scaling component and/or programs that communicate/use the remote resources 910, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
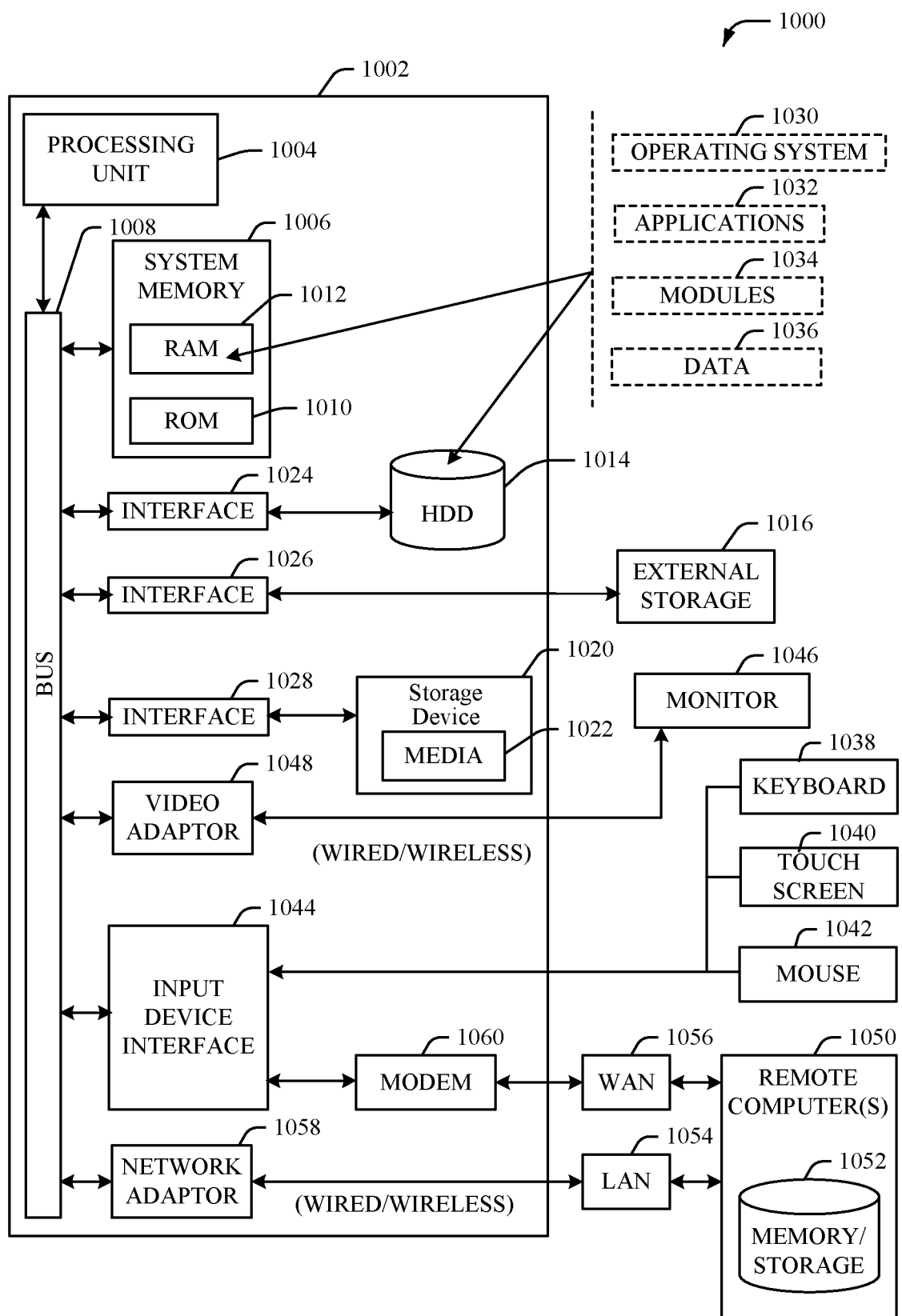
FIG. 10 depicts an example schematic block diagram of a computing environment with which the disclosed subject matter can interact/be implemented at least in part, in accordance with various embodiments and implementations of the subject disclosure.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014.

Other internal or external storage can include at least one other storage device 1020 with storage media 1022 (e.g., a solid state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1094 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
a processor; and
a memory that stores executable instructions that, when executed by the processor, facilitate performance of operations, the operations comprising:
inputting, to a prediction model, port metrics data monitored from datacenter frontend storage ports coupled to a storage array;
inputting, to the prediction model, historical port-related data captured over a prior timeframe; and
in response to the inputting of the port metrics data and the inputting of the historical port-related data, obtaining port rebalancing information from the prediction model,
wherein the prediction model comprises an autoregressive integrated moving average (ARIMA) model, a linear regression model, and a locally estimated scatterplot smoothing (STL) model, and wherein the obtaining of the port rebalancing information from the prediction model comprises obtaining a weighted combination of predictions from the ARIMA model, the linear regression model, and the STL model.

2. The system of claim 1, wherein the port rebalancing information comprises identification data representing over-utilized frontend storage ports.

3. The system of claim 1, wherein the port rebalancing information comprises future port growth data.

4. The system of claim 1, wherein the model is coupled to cloud-based monitoring tool.

5. The system of claim 1, wherein the model is coupled to the storage array.

6. The system of claim 1, wherein the operations further comprise modifying masking view data to rebalance the frontend storage ports.

7. The system of claim 1, wherein the historical port-related data comprises at least one of usage data, seasonality data or trend data.

8. The system of claim 1, wherein the operations further comprise preprocessing the port metrics input data, the preprocessing comprising at least one of: interpolating missing data, normalizing data spikes in the port metrics input data, or normalizing abrupt shifts in the port metrics input data.

9. The system of claim 1, wherein the port metrics data comprises at least one of: percentage busy data representative of respective percentages that the datacenter frontend storage ports are busy, bandwidth data representative of respective bandwidths associated with the datacenter frontend storage ports, bandwidth by read data representative of respective bandwidths by respective reads associated with the datacenter frontend storage ports, bandwidth by write data representative of respective bandwidths by respective writes associated with the datacenter frontend storage ports, input-output size data representative of respective input-output sizes associated with the datacenter frontend storage ports, input-output size by read data representative of respective input-output sizes by the respective reads associated with the datacenter frontend storage ports, input-output size by write data representative of respective input-output sizes by the respective writes associated with the datacenter frontend storage ports, input-output operations per second data representative of respective input-output operations per second associated with the datacenter frontend storage ports, input-output operations per second by read data representative of respective input-output operations per second by the respective reads associated with the datacenter frontend storage ports, input-output operations per second by write data representative of respective input-output operations per second by the respective writes associated with the datacenter frontend storage ports, latency data representative of respective latencies associated with the datacenter frontend storage ports, latency by read data representative of respective latencies by the respective reads associated with the datacenter frontend storage ports, or latency by write data representative of respective latencies by the respective writes associated with the datacenter frontend storage ports.

10. The system of claim 1, wherein the port metrics data comprises at least one of: average input-output size data representative of respective average input-output sizes associated with the datacenter frontend storage ports, bad receive character count data representative of respective receive character counts associated with the datacenter frontend storage ports, discarded frames count data representative of respective discarded frames counts associated with the datacenter frontend storage ports, expired frames count data representative of respective expired frames counts associated with the datacenter frontend storage ports, input-output data representative of respective inputs-outputs associated with the datacenter frontend storage ports, checksum error count data representative of respective checksum error counts associated with the datacenter frontend storage ports, invalid cyclic redundancy check count data representative of respective invalid cyclic redundancy check counts associated with the datacenter frontend storage ports, link failure count data representative of respective link failure counts associated with the datacenter frontend storage ports, loss of signal count data representative of respective loss of signal counts associated with the datacenter frontend storage ports, loss of sync count data representative of respective loss of sync counts associated with the datacenter frontend storage ports, megabytes read data representative of respective megabytes read via the datacenter frontend storage ports, megabytes written data representative of respective megabytes written via the datacenter frontend storage ports, megabytes data representative of respective megabytes processed via the datacenter frontend storage ports, maximum speed in gigabytes data representative of respective maximum speeds in gigabytes associated with the datacenter frontend storage ports, primitive sequence protocol errors count data representative of respective primitive sequence protocol errors counts associated with the datacenter frontend storage ports, read response time data representative of respective read response times associated with the datacenter frontend storage ports, reads data representative of respective reads via the datacenter frontend storage ports, received end of frame abort count data representative of respective received end of frame abort counts associated with the datacenter frontend storage ports, response time data representative of respective response times associated with the datacenter frontend storage ports, receive power data representative of respective receive powers associated with the datacenter frontend storage ports, speed in gigabytes data representative of respective speeds in gigabytes associated with the datacenter frontend storage ports, transmit power data representative of respective transmit powers associated with the datacenter frontend storage ports, write response time data representative of respective write response times associated with the datacenter frontend storage ports, or write data representative of respective writes via the datacenter frontend storage ports.

11. The system of claim 1, wherein the frontend storage ports are coupled to at least one director engine, and wherein the port metrics data comprise director engine data comprising at least one of: new orders per minute data representative of respective new orders handled per minute via the datacenter frontend storage ports, transactions per minute data representative of respective transactions handled per minute via the datacenter frontend storage ports, server processor utilization data representative of respective server processor utilization corresponding to processing via the datacenter frontend storage ports, input-output operations per second data representative of respective input-output operations per second associated with the datacenter frontend storage ports, average read response time data representative of respective average read response times associated with the datacenter frontend storage ports, or average write response time data representative of respective average write response times associated with the datacenter frontend storage ports.

12. The system of claim 1, wherein the port rebalancing information comprises identification data representing less utilized-frontend storage ports based on utilization criterion data associated with a provisioning request.

13. The system of claim 1, wherein the prediction model comprises at least one of: an autoregressive integrated moving average model, a linear regression model, or a seasonal and trend decomposition using locally estimated scatterplot smoothing model.

14. A method, comprising:

inputting, to a prediction model by a system comprising at least one processor, port metrics data monitored from datacenter frontend storage ports coupled to a storage array;

inputting, to the prediction model by the system, historical port-related data captured over a prior timeframe; and in response to the inputting of the port metrics data and the inputting of the historical port-related data, obtaining, by the system, port rebalancing information from the prediction model, wherein the prediction model comprises an autoregressive integrated moving average (ARIMA) model, a linear regression model, and a locally estimated scatterplot smoothing (STL) model, and wherein the obtaining of the port rebalancing information from the prediction model comprises obtaining a weighted combination of predictions from the ARIMA model, the linear regression model, and the STL model.

15. The method of claim 14, wherein the port rebalancing information comprises identification data representing over-utilized frontend storage ports.

16. The method of claim 14, further comprising:

modifying, by the system, masking view data to rebalance the frontend storage ports.

17. A non-transitory machine-readable medium, comprising executable instructions that, when executed by a processor, facilitate performance of operations, the operations comprising:

inputting, to a prediction model, port metrics data monitored from datacenter frontend storage ports coupled to a storage array;

inputting, to the prediction model, historical port-related data captured over a prior timeframe; and in response to the inputting of the port metrics data and the inputting of the historical port-related data, obtaining port rebalancing information from the prediction model, wherein the prediction model comprises an autoregressive integrated moving average (ARIMA) model, a linear regression model, and a locally estimated scatterplot smoothing (STL) model, and wherein the obtaining of the port rebalancing information from the prediction model comprises obtaining a weighted combination of predictions from the ARIMA model, the linear regression model, and the STL model.

18. The non-transitory machine-readable medium of claim 17, wherein the port rebalancing information comprises identification data representing less utilized-frontend storage ports based on utilization criterion data associated with a provisioning request.

19. The non-transitory machine-readable medium of claim 17, wherein the operations further comprise preprocessing the port metrics input data, the preprocessing comprising interpolating missing data.

20. The non-transitory machine-readable medium of claim 17, wherein the operations further comprise preprocessing the port metrics input data, the preprocessing comprising at least one of normalizing data spikes in the port metrics input data, or normalizing abrupt shifts in the port metrics input data.

* * * * *